(12) United States Patent
Dabak et al.

(10) Patent No.: US 12,449,290 B2
(45) Date of Patent: Oct. 21, 2025

(54) DYNAMIC TEMPERATURE CALIBRATION OF ULTRASONIC TRANSDUCERS

(71) Applicant: TEXAS INSTRUMENTS INCORPORATED, Dallas, TX (US)

(72) Inventors: Anand Dabak, Plano, TX (US); Srinath Mathur Ramaswamy, Murphy, TX (US); Luis Fernando Reynoso Covarrubias, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1880 days.

(21) Appl. No.: 16/232,138

(22) Filed: Dec. 26, 2018

(65) Prior Publication Data

US 2020/0209031 A1 Jul. 2, 2020

(51) Int. Cl.
*G01F 1/667* (2022.01)

(52) U.S. Cl.
CPC .................... *G01F 1/668* (2013.01)

(58) Field of Classification Search
None
See application file for complete search history.

(56) References Cited

U.S. PATENT DOCUMENTS

| | | | | |
|---|---|---|---|---|
| 5,337,558 A | * | 8/1994 | Komatsu | F02D 41/1474 60/276 |
| 5,831,175 A | * | 11/1998 | Fletcher-Haynes | G01F 1/72 73/861.28 |
| 6,917,887 B2 | | 7/2005 | Henry et al. | |
| 7,124,646 B2 | * | 10/2006 | Henry | G01F 1/8404 73/861.356 |

(Continued)

FOREIGN PATENT DOCUMENTS

| | | |
|---|---|---|
| CN | 103453956 A | 12/2013 |
| CN | 203443622 U | 2/2014 |

(Continued)

OTHER PUBLICATIONS

International Search Report for PCT/US2019/066715 mailed Mar. 19, 2020.

*Primary Examiner* — Shelby A Turner
*Assistant Examiner* — Brandon J Becker
(74) *Attorney, Agent, or Firm* — Xianghui Huang; Frank D. Cimino (57) ABSTRACT

A computer-readable storage device stores machine instructions which, when executed by one or more central processing unit (CPU) cores, causes the one or more CPU cores to use a first ultrasonic transducer and a second ultrasonic transducer to measure fluid flow using a current measurement frequency and to perform a temperature calibration process. The temperature calibration process includes the sequentially generation of a plurality of electrical signals for the first ultrasonic transducer, the generated electrical signals each having a different frequency. For each frequency, the temperature calibration process includes the measurement of an amplitude of a signal from the second ultrasonic transducer. Based on the measured amplitudes of the signals from the second ultrasonic transducer, the temperature calibration process includes the determination of a new measurement frequency. The first and second ultrasonic transducers are used to measure fluid flow using the new measurement frequency.

19 Claims, 4 Drawing Sheets

(56) References Cited

U.S. PATENT DOCUMENTS

| | | | |
|---|---|---|---|
| 8,307,711 B2* | 11/2012 | Biggs | G01N 29/30 |
| | | | 73/579 |
| 8,467,986 B2* | 6/2013 | Henry | G01F 1/849 |
| | | | 702/100 |
| 2004/0035190 A1* | 2/2004 | Sinha | G01N 29/024 |
| | | | 73/61.49 |
| 2004/0173031 A1 | 9/2004 | Gicza | |
| 2006/0016243 A1 | 1/2006 | Nevius | |
| 2007/0084286 A1 | 4/2007 | Ajay et al. | |
| 2007/0119263 A1 | 5/2007 | Henry | |
| 2008/0262796 A1* | 10/2008 | Rufer | G01F 25/10 |
| | | | 702/184 |
| 2011/0264385 A1* | 10/2011 | Weinstein | G01N 9/002 |
| | | | 702/45 |
| 2012/0055262 A1* | 3/2012 | Sinha | G01F 1/712 |
| | | | 73/861.04 |
| 2015/0355001 A1 | 12/2015 | Dabak et al. | |
| 2016/0080093 A1* | 3/2016 | Dabak | G01F 1/66 |
| | | | 367/140 |
| 2017/0115255 A1* | 4/2017 | Sathyanarayana | G01N 29/343 |
| 2020/0149979 A1* | 5/2020 | Roth, II | G10K 11/24 |

FOREIGN PATENT DOCUMENTS

| | | |
|---|---|---|
| CN | 106855424 A | 6/2017 |
| EP | 0919793 B1 | 4/2009 |
| JP | S54130159 A | 10/1979 |
| JP | S6461625 A | 3/1989 |
| JP | H02105055 U | 8/1990 |
| JP | H04274771 A | 9/1992 |
| JP | 2007533967 A | 11/2007 |
| JP | 2012107874 A | 6/2012 |
| JP | 2018136276 A | 8/2018 |
| WO | 2017053743 A1 | 3/2017 |

* cited by examiner

DYNAMIC TEMPERATURE CALIBRATION OF ULTRASONIC TRANSDUCERS

BACKGROUND

Flowmeters are used to measure fluid flow through a pipe. Some flowmeters use ultrasonic transducers in which an ultrasonic signal is injected into the fluid flow in the downstream direction of fluid flow between two ultrasonic transducers and the absolute time-of-flight (TOF) is determined in the downstream direction. Another ultrasonic signal is injected in the upstream direction and the absolute TOF between the transducers in that direction is also determined. The difference in the TOFs between the upstream and downstream direction can be used to compute the velocity of the fluid flow and, with knowledge of the cross-sectional area of the pipe, the flow rate.

SUMMARY

A computer-readable storage device stores machine instructions which, when executed by one or more central processing unit (CPU) cores, causes the one or more CPU cores to use a first ultrasonic transducer and a second ultrasonic transducer to measure fluid flow using a current measurement frequency and to perform a temperature calibration process. The temperature calibration process includes the sequentially generation of a plurality of electrical signals for the first ultrasonic transducer, the generated electrical signals each having a different frequency. For each frequency, the temperature calibration process includes the measurement of an amplitude of a signal from the second ultrasonic transducer. Based on the measured amplitudes of the signals from the second ultrasonic transducer, the temperature calibration process includes the determination of a new measurement frequency. The first and second ultrasonic transducers are used to measure fluid flow using the new measurement frequency.

BRIEF DESCRIPTION OF THE DRAWINGS

For a detailed description of various examples, reference will now be made to the accompanying drawings in which.

DETAILED DESCRIPTION

For at least some ultrasonic transducers used in flowmeters, the sensitivity of the transducer varies with frequency. For example, the maximum transducer sensitivity may be at a particular frequency. Further, the sensitivity of the transducer can vary with temperature. That is, the frequency corresponding to the maximum sensitivity of the transducer may vary with temperature of the fluid whose flow rate the flowmeter is monitoring.

The described examples pertain to a circuit (e.g., an integrated circuit (IC)) for a flowmeter that performs a temperature-based calibration process. The flowmeter comprises multiple ultrasonic transducers. The temperature-based calibration process includes sweeping one of the transducers through a range of frequencies from a lower frequency to a higher frequency (i.e., providing a range of excitation frequencies to the transducer), monitoring the amplitude of the signal from another transducer in the flowmeter, and determining the frequency corresponding to maximum sensitivity within the frequency range. The flowmeter is then configured to use as an excitation frequency the frequency determined from the calibration process going forward in measuring the flowrate of the fluid. The temperature-based calibration process can be repeated over time thereby dynamically adjusting its excitation frequency responsive to changes in temperature. The temperature-based calibration process is thus performed dynamically, that is, while the flowmeter is being used to make flow rate measurements of fluid flow in a pipe.

Figure 1:
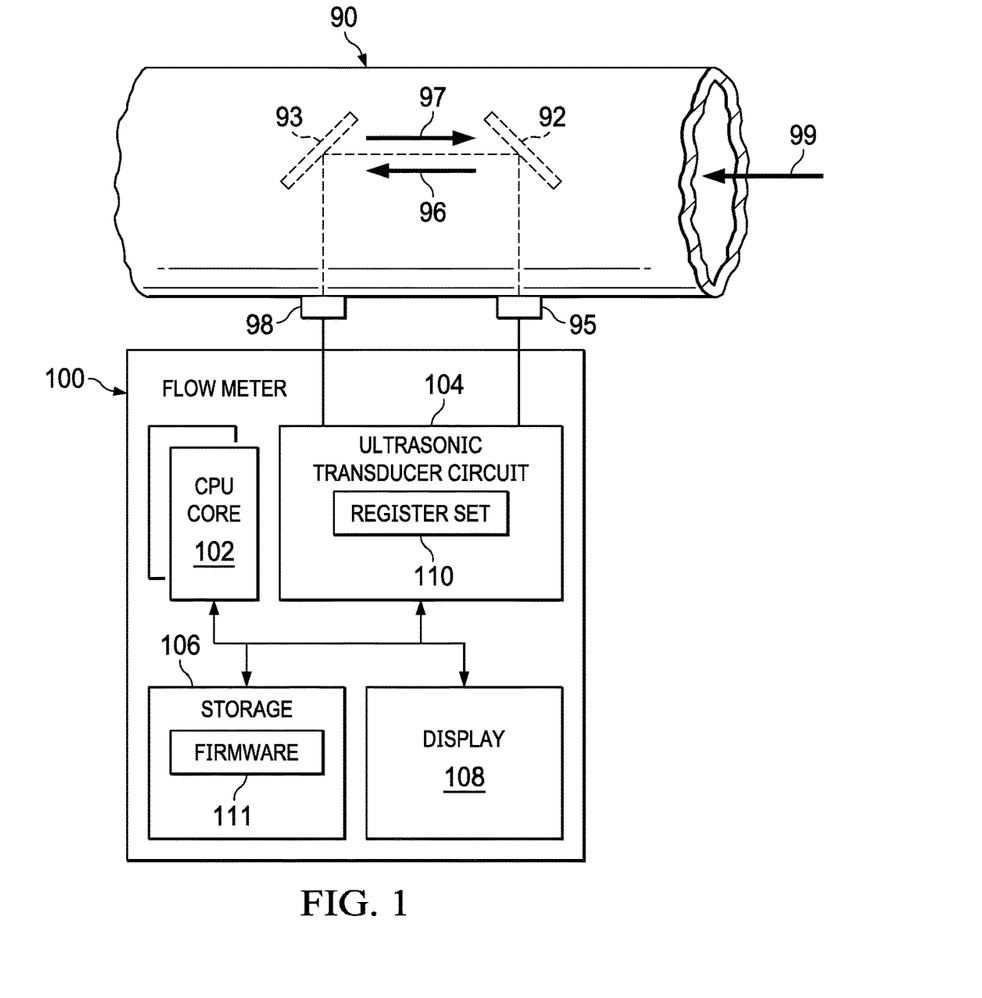
FIG. 1 illustrates a flowmeter in accordance with one example.

FIG. 1 shows an example of a flowmeter 100. The example flowmeter 100 includes one or more central processing unit (CPU) cores 102, an ultrasonic transducer (UST) circuit 104, storage 106, and a display 108. The term "CPU core" (singular) is used herein to refer to either a single CPU core or multiple CPU cores. In one implementation, the flowmeter 100 comprises a microcontroller unit (MCU) fabricated as an integrated circuit on a common semiconductor substrate. The flowmeter 100 also includes or couples to ultrasonic transducers 95 and 98, which are shown coupled to a pipe 90 in which a fluid flows in the direction of arrow 99. A pair of ultrasonic signal reflectors 92 and 93 are included in the pipe 90 in this example. The UST circuit 104 can provide an electrical signal to either of transducers 95 or 98 and monitor the resulting signal from the other transducer. For example, transducer 95 can convert an electrical signal from the UST circuit 104 into an ultrasonic signal injected into the fluid flow in pipe 90. The ultrasonic signal reflects off reflector 92 and then reflector 93 as indicated by arrow 96 (in the downstream direction). The ultrasonic signal then is received by transducer 98 and converted back into an electrical signal and provided to UST circuit 104. Alternatively, the UST circuit 104 can use transducer 98 as the transmitting transducer and transducer 95 as the receiving transducer thereby causing an ultrasonic signal to pass through the fluid in the direction of arrow 97 (in the upstream direction). In some implementations, the pipe 90 does include reflectors 92 and 93.

The UST circuit 104 measures the time it takes for the ultrasonic signal to pass through the fluid flow from one transducer to another. With no fluid flow relative to the transducers 95, 98, the speed of an ultrasonic signal in the fluid is a function of the type of fluid in pipe 90. Time is distance/velocity and thus, the time required for an ultrasonic signal to pass in the downstream direction (i.e., from transducer 95, through the fluid, and to transducer 98) is $L/(c+v)$ where L is the combined distance from transducer 95 to reflector 92 to reflector 93 and to transducer 98 and is a known value, c is the speed of ultrasound with respect to the fluid being monitored, and v is the speed of the fluid flow in direction 99. In the upstream direction (i.e., from transducer 98 to transducer 95), the time required for an ultrasonic signal to pass from transducer 98 to transducer 95 is L/(c−v). The difference in the time values is ΔT and the velocity of the fluid is:

$$v = \frac{L}{2}\left(\frac{\Delta T}{T1 * T2}\right) \quad (1)$$

where T1 is the measured time from transducer 95 to transducer 98, and T2 is the measured time from transducer 98 to transducer 95. Thus, by measuring T1 and T2 using the UST circuit 104, the velocity of the fluid flow can be calculated. The cross sectional area of pipe 90 also is known and the volume of the interior of the pipe between transducers 95 and 98 can be calculated and known apriori. Assuming the pipe is full of fluid, the fluid flow rate can be determined based on the calculated velocity.

The storage 106 comprises volatile or non-volatile memory (non-transitory computer-readable storage device) and includes firmware (machine instructions) 111. The firmware 111 is executable by one or more of the CPU cores 102. Upon execution of the firmware 111, the CPU core 102 interact with the UST circuit 104 to (a) determine the flowrate of fluid in pipe 90 and (b) to perform a temperature calibration process to determine the excitation frequency to use to measure flowrate given the current temperature of the fluid in pipe 90. In some implementations, the temperature calibration process is performed periodically (e.g., every 5 minutes, every 10 minutes, etc.) and in between flowrate determinations (so as not to interfere with assessing flowrate). The display 108 can be used by the CPU core 102 to display flowrate, status, etc.

Figure 2:
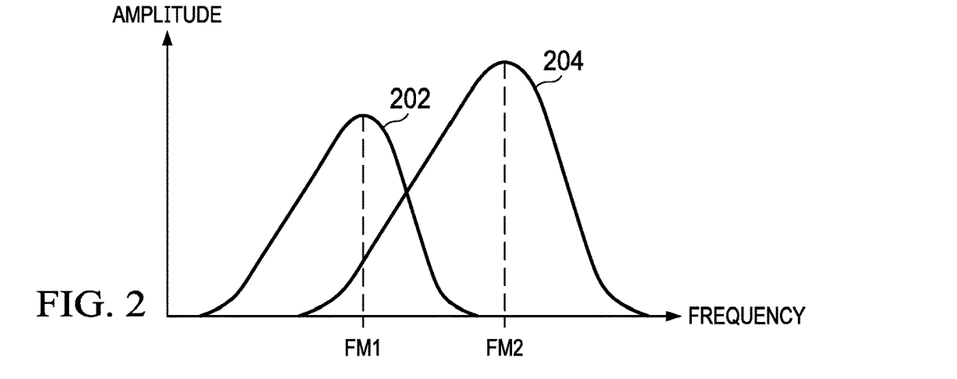
FIG. 2 illustrates that the frequency response of an ultrasonic transducer is, at least in part, temperature dependent.

FIG. 2 illustrates two example frequency responsive curves 202 and 204 for an ultrasonic transducer. Each curve 202, 204 represents the amplitude of an electrical signal generated by a transducer in response to receipt of an ultrasonic signal across a range of frequencies. The amplitude of the ultrasonic signal received by the transducer is the same at each frequency. The transducers generate an electrical output signal based on the received ultrasonic signal. Each curve 202, 204 illustrates that the amplitude of the electrical output signal from the transducers varies with frequency. The amplitude response is maximum at frequency Fm1 for curve 202 and at frequency Fm2 for curve 204, Frequency response curve 202 represents the frequency response of the ultrasonic transducer for one temperature at which the transducer operates and frequency response 204 represents the frequency response of the same transducer at a different temperature. As can be seen, the peak amplitude (maximum sensitivity) is a function of temperature. The temperature calibration process described herein determines the peak amplitude for a given fluid temperature and uses the corresponding frequency to make flowrate determinations.

Referring back to FIG. 1, the UST circuit 104 includes a register set 110 which comprises one or more registers. At least some of the registers are configurable and/or readable by the CPU core 102. In one implementation, the CPU core 102 programs the register set 110 with one or more values indicative of the frequency that the UST circuit 104 is to generate for one of the transducers 95, 98. During the temperature calibration process, the CPU core 102 sequences through a range of frequencies from a first frequency to a second frequency. The first frequency may be lower than the second frequency, or vice versa. That is, the frequency sweep may be from a lower frequency to a higher frequency or from a higher frequency down to a lower frequency. The range of frequencies should be wide enough to include the excitation frequency that will correspond to the maximum transducer sensitivity given the present temperature of the fluid in pipe 90. In one example, the first frequency is 160 KHz and the second frequency is 260 KHz.

For each frequency, CPU core 102 configures a value into register set 110. The UST circuit 104 uses that value to generate an electrical signal having a frequency corresponding to the value programed by the CPU core 102. In one example, the UST circuit generates the electrical signal as a specified number of pulses of a pulse train and at a specific frequency. The CPU core 102 programs values into the register set 110 that encode the frequency and the number of pulses (e.g., 10 pulses) for the UST circuit 104 to generate.

The UST circuit 104 then generates the desired electrical signal to one of the transducers 95, 98—it does not matter which transducer is used as the excitation transducer—to thereby generate the ultrasonic signal. The UST circuit 104 receives the signal from the other transducer and determines a value proportional to that signal's amplitude. UST circuit 104 then stores the determined amplitude in, for example, storage 106. The CPU core 102 then programs different values into register set 110 to cause the UST circuit 104 to generate an excitation electrical signal at a different frequency. The resulting transducer amplitude is stored in storage 106 along with values indicative of its excitation frequency. The process repeats until the second frequency is reached. The separation between adjacent frequency steps is application-specific. In one example, frequencies from 160 KHz to 260 KHz in 1 KHz steps are used during the calibration process.

Figure 3:
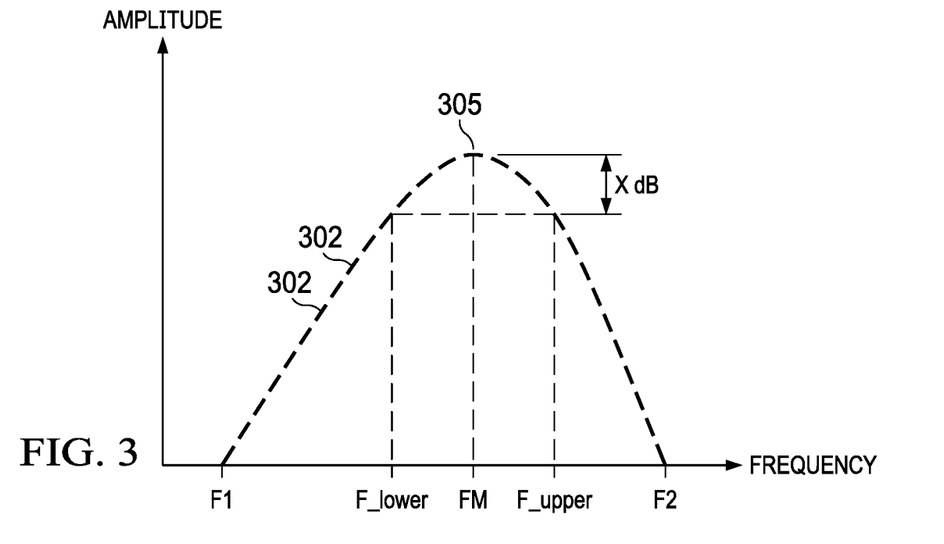
FIG. 3 illustrates a frequency sweep performed during a temperature-based calibration process.

FIG. 3 shows an example of the amplitudes 302 determined for the excitation frequencies between a first frequency, F1, and a second frequency, F2, for the temperature of the fluid in pipe 90 when the calibration process is performed. Frequency Fm generally designates the frequency corresponding to the maximum amplitude 305. F1 should be set to be lower than the lowest predicted value for the frequency at the maximum amplitude and F2 should be set to be greater than the highest predicted value for the frequency at the maximum amplitude so that the frequency sweep will be sure to include the frequency at the maximum amplitude for any fluid temperature that may be present in pipe 90.

The CPU core 102 in FIG. 1 reads the amplitude values back from storage 106 (either after all amplitude values have been acquired and stored or after each amplitude value is stored) and determines the excitation frequency that corresponds to the peak amplitude (i.e., maximum sensitivity). In one implementation, CPU core 102 determines the maximum amplitude value from among the amplitude values stored in storage 106 and then selects the frequency associated with that value as the excitation frequency to use in determining flowrates going forward.

In other implementation, CPU core 102 identifies the maximum amplitude from among the amplitudes 302 determined during the frequency sweep. CPU core 102 converts each amplitude to a decibel (dB), for example 10*log (amplitude) and subtracts X dB from the largest dB value. In one example X dB is 1 dB. CPU core 102 then determines the two frequencies corresponding to the dB values that are X less than the largest dB value. FIG. 3 illustrates these frequencies as F_lower and F_upper. CPU core 102 determines the excitation frequency to use for flowrate measurements based on F_lower and F_upper. For example, CPU core 102 can average together F_lower and F_upper. In another example, CPU core 102 computes the median of F_lower and F_upper as the excitation frequency.

Figure 4:
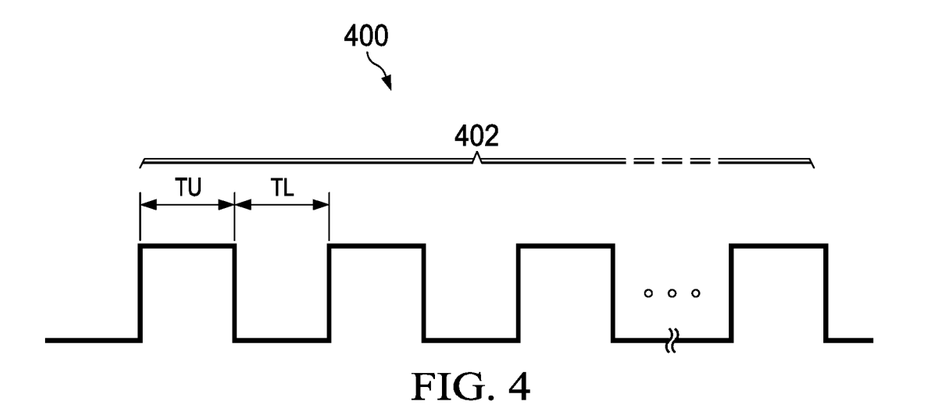
FIG. 4 illustrates a pulse train used during a temperature-based calibration process.

As noted above, the UST circuit 104 generates the electrical signal to be provided to a transducer 95, 98 as a number of pulses of a pulse train at a specific frequency. FIG. 4 shows an example of a pulse train 400. Pulse train 400 include N pulses 402, where N is one or more. In one example, N is 10. Each cycle of the pulse train is characterized by time values TU and TL, where TU is the time during which the pulse is at a higher voltage level and TL is the time during which the pulse is at a lower voltage value. The period of each cycle is TU+TL and is the inverse of the frequency. As such, a desired frequency dictates the sum of TU and TL. TU and TL can be equal, but need not be equal. If TU and TL are equal, the resulting pulse train has a 50% duty cycle, but the duty cycle can be greater than 50% if TU is greater than TL or smaller than 50% if TU is less than TL. In one example, the CPU core 102 programs UST circuit 104 with three values to defining the target pulse train. The three values include TU, TL and the number of pulses 402 of the pulse train.

Figure 5:
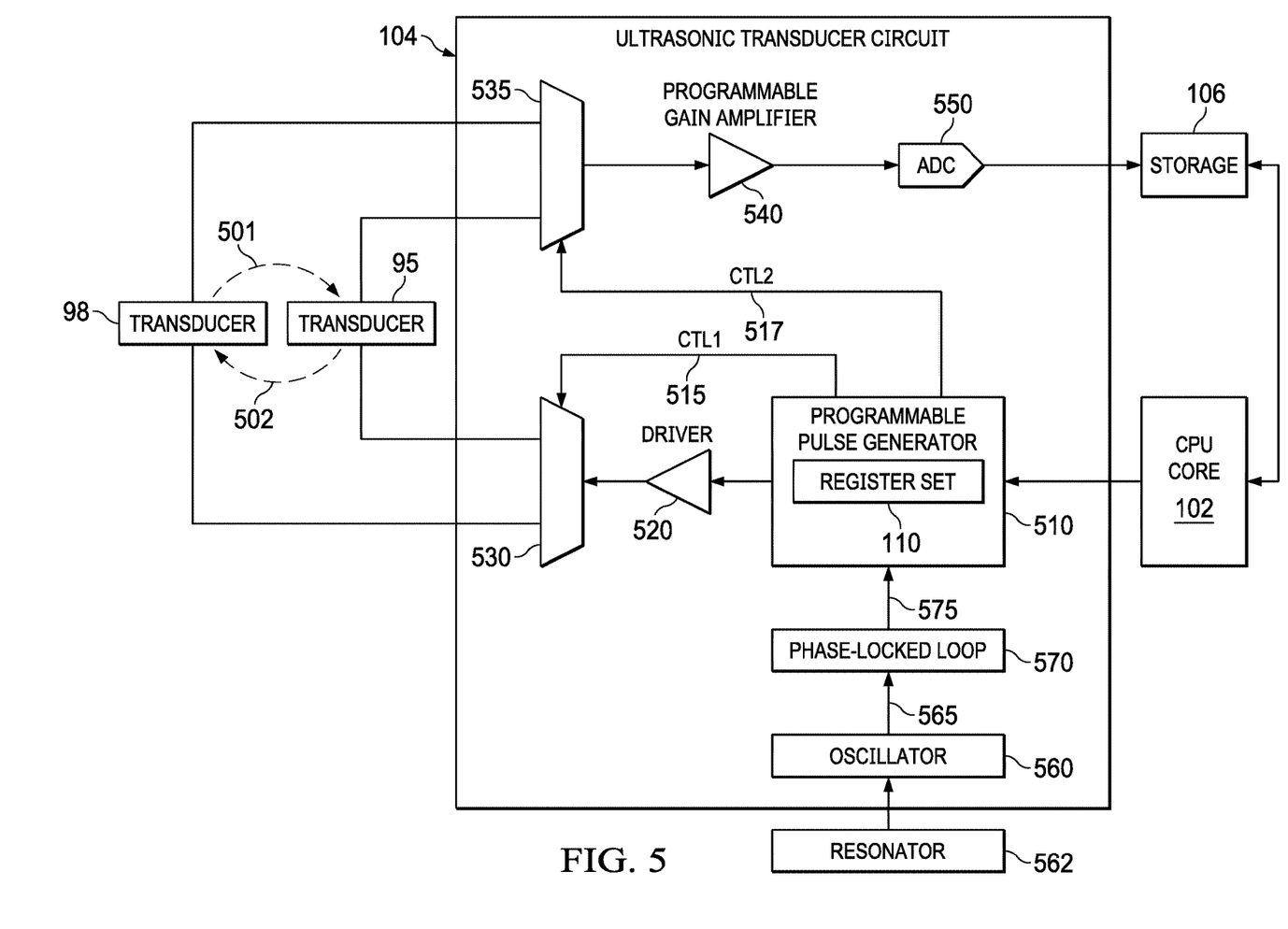
FIG. 5 shows an example of an ultrasonic transducer circuit usable to perform the temperature-based calibration process.

FIG. 5 shows an example implementation of the UST 104 coupled to the CPU core 102, storage 106 and ultrasonic transducers 96 and 98. The UST circuit 104 in the example of FIG. 5 includes a programmable pulse generator (PPG) 510, a driver 520, multiplexers 530 and 535, a programmable gain amplifier (PGA) 540, an analog-to-digital converter (ADC) 550, an oscillator (OSC) 560, and a phase-locked loop (PLL) 570. The CPU core 102 programs the values defining the desired pulse train into register set 110, which is included in, or is accessible to, the PPG 510. An oscillator 560 generates a clock 565 based on a signal received from an external resonator 562. The external resonator may comprise a crystal resonator or a ceramic resonator. The clock 565 from oscillator 560 is provided as a reference clock to PLL 570 which, in turn, generates a clock 575 to the PPG 510. In some examples, the clock 575 generated by the PLL 570 is phase-locked to clock 565, but has a higher frequency than clock 565. For example, the frequency of clock 565 may be 8 MHz and the frequency of clock 575 may be in the range of 68 to 80 MHz.

The PPG 510 generates a pulse train using clock 575. The number of pulses of the pulse train and the frequency of the pulse train are dictated by the values written to register set 110 by the CPU core 102 (e.g., TU, TL, and the number of pulses). The resulting pulse train is provided to driver 520 which conditions the pulse train for driving one of the transducers 95, 98. The condition implemented by the driver 520 may include voltage level shifting, amplification, etc.

For the temperature calibration process described herein, one of the transducers is used to generate the ultrasonic signal with the other transducer functioning as the ultrasonic signal receiving transducer. Multiplexer 530 is configured by control signal CTL1 to select one of the transducers 95, 98 to receive the pulse train from driver 520. The PPG 510 in this example generates CTL1. The PPG 510 also asserts control signal CTL2 to configure multiplexer 535 to provide the electrical signal generated by the receiving transducer to the PGA 540. To perform the temperature calibration process, for example, PPG 510 asserts CTL1 to electrically couple driver 520 to transducer 95 to thereby generate the ultrasonic signal 502, and asserts CTL2 to electrically couple transducer 98 to PGA 540.

The signal from the sensing transducer is provided through multiplexer 535 to PGA 540 where the signal is amplified. The amplified analog signal is then provided to ADC 550 which converts the amplified analog signal to a digital representation. In one implementation, ADC 550 includes a sigma-delta modulator (e.g., third order sigma-delta modulator). The resulting digital value is indicative of the amplitude of the signal received by the ultrasonic transducer and is stored in, for example, in storage 106. The CPU core 102 can then read the digital value from storage 106. Multiple excitation frequencies are used as described above and the resulting digital values are stored in storage 106. The CPU core 102 determines the excitation frequency to use based on the resulting digital values.

To determine flowrate using the excitation frequency produced by a previous execution of the temperate calibration process, the CPU core 102 configures the PPG 510 to generate a pulse train to be provided first to one transducer with the other transducer's signal to be provided to PGA 540. The CPU core 102 can write a value to register set 110 to specify which transducer to use to generate the ultrasonic signal and which to use as the ultrasonic signal receiving transducer (e.g., transducer 95 used to generate the ultrasonic signal and the electrical signal from transducer 98 to be provided to PGA 540). The resulting digital value from ADC 550 is stored in storage 106. The CPU 102 can then write values to the register set 110 to reverse the roles of transducers 95 and 98 (e.g., transducer 98 used to generate the ultrasonic signal and the electrical signal from transducer 95 to be provided to PGA 540). A timer derived from the PLL output can be used to drive a sequencer which controls the start time of the PPG 510 and the start of ADC sampling. The difference between these two events represents a static offset for both the upstream and downstream time-of-flight. Using the signal digitized by the ADC 550, any of multiple different methods can be used to compute TOF. In one example, the envelope of the signal is calculated and the time when the envelope crosses a predefined threshold is determined. The threshold can be calculated based on the maximum amplitude of the signal. The amplitude of the signal crossing the threshold is used to determine the presence of the signal.

Figure 6:
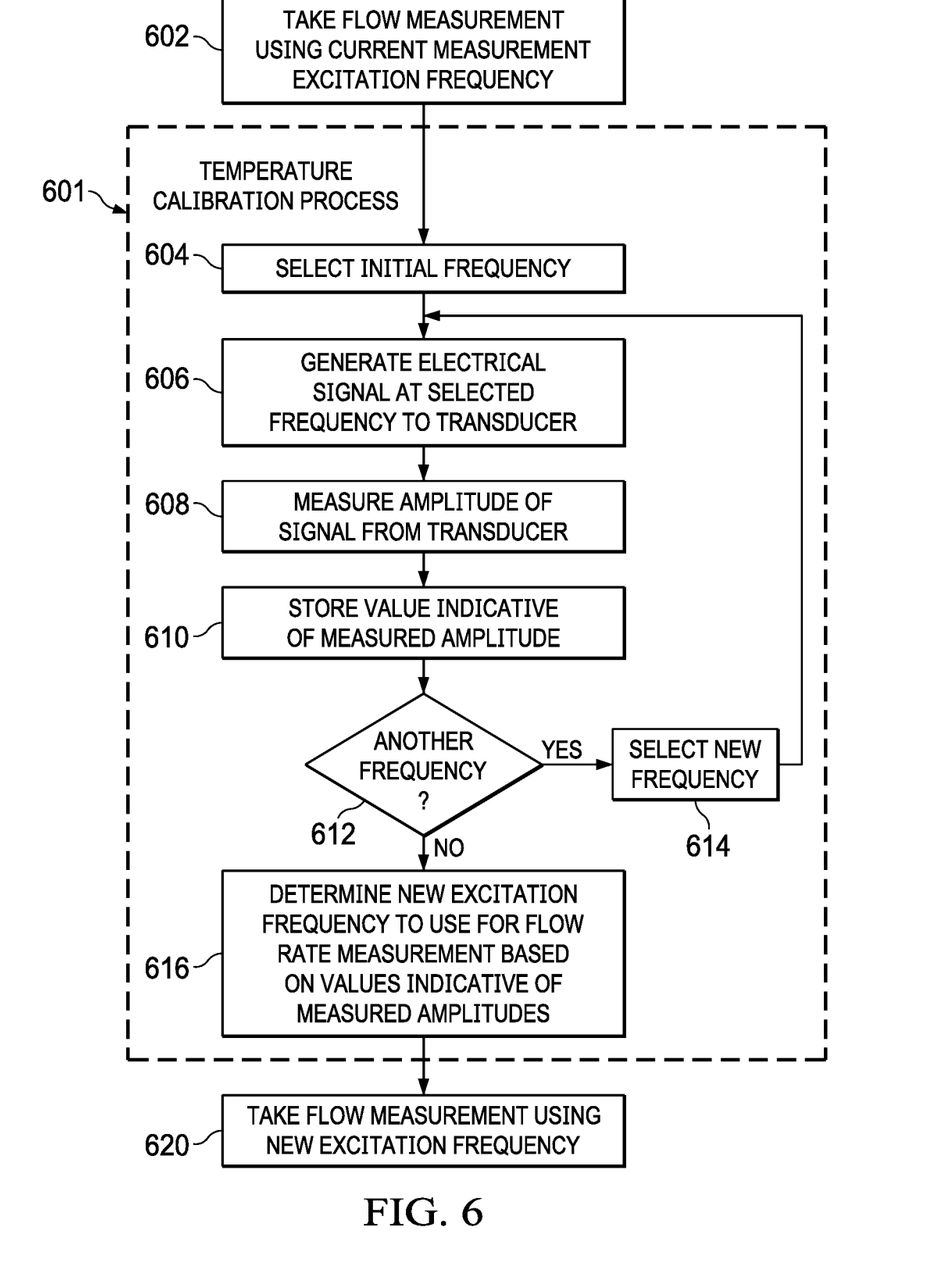
FIG. 6 shows an example of a method for the temperature-based calibration process.

FIG. 6 shows a method describing an example of the temperature calibration process. The temperature calibration process is controlled by the CPU 102 executing firmware 111 and interacting with the USC circuit 104. The temperature calibration process comprises operations 604-616 as indicated by reference number 601. Operation 602 comprises making a flow measurement using a current value of an excitation frequency. The current excitation frequency may have been determined in accordance with a prior performance of the temperature calibration process. Use of the UST circuit 104 to determine flow velocity (and thus flow rate) is explained above.

At 604, the temperature calibration process includes selecting an initial frequency, as part of the frequency sweep. In some implementations, the initial frequency has a value that is lower than the lowest frequency expected for the maximum transducer amplitude. In other implementations, the initial frequency has a value that is higher than the highest frequency expected for the maximum transducer amplitude. The initial frequency is selected or otherwise programmed into the CPU core 102 via firmware 111.

At 606, the temperature calibration process includes generating an electrical signal at the selected frequency for one of the ultrasonic transducers 95, 98. In some cases, this operation includes the CPU core 102 determining the values of T1 and T2 for the selected frequency and the number of pulses and writing corresponding values to register set 110 in the UST circuit 104. The PPG 510 then generates the programmable pulse train, which is provided through multiplexer 530 (controlled by CTL1 from PPG 510) to one of the transducers (e.g., transducer 95).

At 608, the amplitude of the electrical signal generated by the other transducer (e.g., transducer 98) is measured. This operation may be performed by amplifying the detected signal by PGA 540 and converting the amplified signal to a digital representation by ADC 550. The resulting digital value is then stored in storage 106 (610).

The temperature calibration process implements a frequency sweep and thus, at 612, the CPU 102 determines whether another frequency remains to be used for the frequency sweep. In one example, the frequency sweep includes frequencies in 1 KHz increments between 160 KHz and 260 KHz. The frequencies are used in ascending or descending order in some examples, but can be used in an order other than ascending or descending in other examples. If another frequency remains to be used, then the next frequency in the sweep is selected at 614 and the process repeats at operation 606. Once all of the frequencies within the range of the frequency sweep are used to generate amplitude values, then at 616 the temperature calibration process determines the new frequency to use for future flowrate measurements based on the digital value representations of the amplitudes. Examples of how to determine the excitation frequency to use are provided above. The newly determined excitation frequency is then used at 620 the next time the CPU 102 uses the UST circuit 104 to determine flow velocity (rate).

In some cases, the temperature calibration process 601 is performed between every pair of consecutive flowrate measurements. In other cases, the temperature calibration process 601 is performed between pairs of consecutive flowrate measurements, but not necessarily between every pair of consecutive flowrate measurements. For example, flowrate measurements may be performed at one-minute intervals, but the temperature calibration process is performed at 5-minute or 10-minute (or other) intervals. In some cases, the temperature calibration process is performed at an interval that is at least a 5 minute interval.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A non-transitory, computer-readable storage device storing machine instructions which, when executed by one or more central processing unit (CPU) cores, cause the one or more CPU cores to:
   use a first ultrasonic transducer and a second ultrasonic transducer to measure fluid flow using a present excitation frequency;
   perform a calibration process that includes:
      sequential generation of a plurality of electrical signals for the first ultrasonic transducer, each generated electrical signal having a respective frequency, and each generated electrical signal comprising a pulse train having a plurality of pulses;
      for each respective frequency, measurement of an amplitude of a signal received by the second ultrasonic transducer;
      based on the measured amplitudes of the signals,
         determination of a first frequency corresponding to a peak amplitude from among the measured amplitudes;
         determination of a second frequency based on the peak amplitude, the second frequency being smaller than the first frequency;
         determination of a third frequency based on the peak amplitude, the third frequency being lager than the first frequency; and
         determination of a new excitation frequency that is equal to an average of the second frequency and the third frequency; and
   use the first and the second ultrasonic transducers to measure the fluid low based on the new excitation frequency.

2. The non-transitory, computer-readable storage device of claim 1, wherein, when executed by the one or more CPU cores, the machine instructions cause the one more CPU cores to:
   determine a second new excitation frequency that is equal to the first frequency; and
   use the first and the second ultrasonic transducers to measure the fluid flow based on the second new excitation frequency.

3. The non-transitory, computer-readable storage device of claim 1, wherein, when executed by the one or more CPU cores, the machine instructions cause the one more CPU cores to:
   determine a new excitation frequency that is equal to a median of the second frequency and the third frequency; and
   use the first and the second ultrasonic transducers to measure the fluid based on the second new excitation frequency.

4. The non-transitory, computer-readable storage device of claim 1, wherein, when executed by the one or more CPU cores, the machine instructions cause the one more CPU cores to generate each of the plurality of electrical signals through configuration of one or more registers to include:
   a first value indicative of a number of pulses of each pulse train;
   a second value indicative of a first time period during which each pulse is to be at a first voltage level; and
   a third value indicative of a second time period during which each pulse is to be at a second voltage level.

5. The non-transitory, computer-readable storage device of claim 1, wherein, when executed by the one or more CPU cores, the machine instructions cause the one more CPU cores to perform the temperature calibration process once every M minutes, and wherein M is at least 5.

6. The non-transitory, computer-readable storage device of claim 1, wherein, when executed by the one or more CPU cores, the machine instructions cause the one more CPU cores to perform the calibration process between a pair of measurements of the fluid flow.

7. The non-transitory, computer-readable storage device of claim 6, wherein the pair of measurements of the fluid flow is a pair of consecutive measurements of the fluid flow.

8. A device, comprising:
   one or more central processing unit (CPU) cores configured to:
      use a first ultrasonic transducer and a second ultrasonic transducer to measure fluid flow using a present excitation frequency;
      perform a calibration process that includes;

sequentially generating a plurality of electrical signals for the first ultrasonic transducer, each generated electrical signal having a respective frequency, and each generated electrical signal comprising a pulse train having a plurality of pulses;

for each respective frequency, measuring an amplitude of a signal received by the second ultrasonic transducer;

based on the measured amplitudes of the signals,
determining a first frequency corresponding to a peak amplitude from among the measured amplitudes;
determining a second frequency based on the peak amplitude, the second frequency being smaller than the first frequency;
determining a third frequency based on the peek amplitude, the third frequency being larger than the first frequency; and
determining a new excitation frequency based on an average of the second frequency and the third frequency; and use the first ultrasonic transducer and the second ultrasonic transducer to measure the fluid flow based on the new excitation frequency.

9. The device of claim 8, wherein the one more CPU cores we configured to:
determine a second new excitation frequency based on the first frequency; and
use the first ultrasonic transducer and the second ultrasonic transducer to measure the fluid flow based on the second new excitation frequency.

10. The device of claim 8, wherein the one more CPU cores are configured to:
determine a second new excitation frequency based on a median of the second frequency and the third frequency; and
use the first ultrasonic transducer and the second ultrasonic transducer to measure the fluid flow based on the second new excitation frequency.

11. The device of claim 8, wherein the one more CPU cores are configured to generate each of the plurality of electrical signals through configuration of one or more registers to include:
a first value indicative of a number of pulses of the pulse train;
a second value indicative of a first time period during which each pulse is to be at a first voltage level; and
a third value indicative of a second time period during which each pulse is to be at a second voltage level.

12. The device of claim 8, further comprising:
a programmable pulse generator programmable by the one or more CPU cores to generate the plurality of electrical signals; and
an analog-to-digital converter configured to convert the signal from the second ultrasonic transducer to a digital value.

13. The device of claim 8, wherein the one or more CPU cores are configured to repeatedly perform the calibration process between every pair of measurements of the fluid flow.

14. The device of claim 13, wherein the every pair of measurements of the fluid flow is every pair of consecutive measurements of the fluid flow.

15. A method, comprising:
using a ultrasonic transducer and a second ultrasonic transducer to measure fluid flow using a present excitation frequency,
performing a calibration processor that includes:
sequentially generating a plurality of electrical signals for the first ultrasonic transducer, each generated electrical signal having a respective frequency, and each generated electrical signal comprising a pulse train having a plurality of pulses;
for each respective frequency, measuring an amplitude of a signal received by the second ultrasonic transducer;
based on the measured amplitudes of the signals,
determining a first frequency corresponding to a peak amplitude from among the measured amplitudes;
determining a second frequency based on the peak amplitude, the second frequency being smaller than the first frequency;
determining a third frequency based on the peak amplitude, the third frequency being larger than the first frequency; and
determining a new excitation frequency based on an average of the second frequency and the third frequency; and
using the first ultrasonic transducer and the second ultrasonic transducer to measure the fluid flow based on the new excitation frequency.

16. The method of claim 15, wherein determining the new excitation frequency comprises:
determining a second new excitation frequency based on the first frequency; and
using the first ultrasonic transducer and the second ultrasonic transducer to measure the fluid flow based on the second end new excitation frequency.

17. The method of claim 15, wherein determining the new excitation frequency comprises:
determining a second new excitation frequency based on a median of the second frequency and the third frequency; and
using the first ultrasonic transducer and the second ultrasonic transducer to measure the fluid flow based on the second new excitation frequency.

18. The method of claim 15, further comprising performing the calibration process between a pair of measurements of the fluid flow.

19. The method of claim 18, wherein the pair of measurements of the fluid flow is a pair of consecutive measurements of the fluid flow.

* * * * *